July 26, 1932.  C. B. HYATT  1,868,943
ADJUSTABLE CONDENSER
Filed Oct. 8, 1929
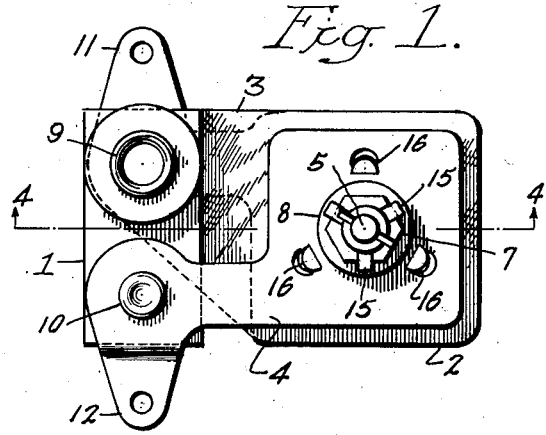
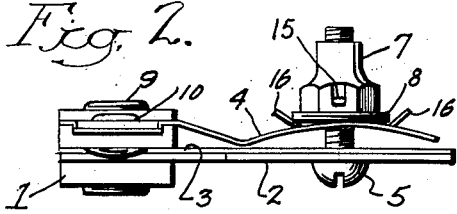
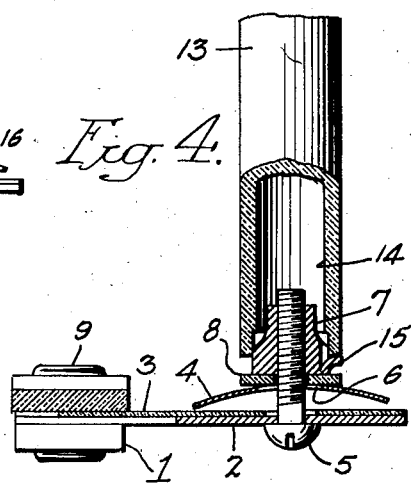
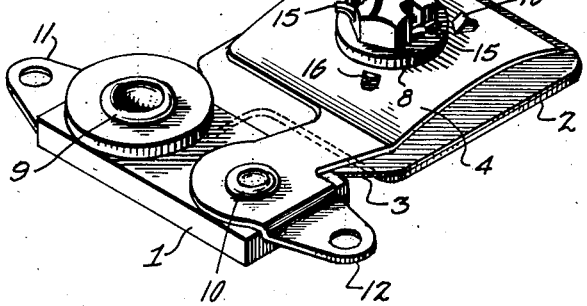
Inventor:-
Clinton Brown Hyatt.
by his Attorneys,
Howson & Howson Patented July 26, 1932

1,868,943

UNITED STATES PATENT OFFICE

CLINTON BROWN HYATT, OF MELROSE PARK, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

ADJUSTABLE CONDENSER

Application filed October 8, 1929. Serial No. 398,191.

This invention relates to improvements in condensers of a type adapted for use in radio receivers and similar electrical apparatus for neutralizing circuits and for similar purposes requiring delicate and extremely accurate adjustment.

The principal object of the invention is to provide a simply constructed condenser of the stated type in which provision is made for readily and accurately adjusting the capacity of the condenser either before or after the condenser has been assembled in the electrical apparatus of which it is a part.

The invention further resides in certain novel and improving structural details hereinafter set forth and illustrated in the attached drawing, in which:

Fig. 1 is a plan view of a condenser made in accordance with my invention;

Fig. 2 is a side elevational view of the condenser;

Fig. 3 is a view of the condenser in perspective, and

Fig. 4 is a section on the line 4—4, Fig. 1 showing also a portion of the condenser-adjusting wrench and the manner in which the latter is applied.

With reference to the drawing, the condenser consists of a strip 1 of insulating material, to one side of which is attached a metal plate 2 of substantial rigidity, constituting one of the active elements of the condenser. Intermediate the plate 2 and strip 1 is secured a sheet, 3, of mica or similar dielectric material, this sheet extending over the surface of the plate 2 as illustrated. To the opposite side of the insulating strip 1 is secured a second metal plate 4, which substantially overlies and parallels the plate 2 and constitutes the other active element of the condenser.

Fixed by soldering or other suitable means in a more or less central position in the plate 2 is a screw 5 which projects upwardly and through an aperture 6 in the plate 4, this aperture being of sufficient size to prevent under normal conditions contact between the screw and the plate 4. At its upper projecting end, the screw 5 carries a nut 7 which is prevented from direct contact with the plate 4 by a collar 8 of suitable insulating material. The plate 4 which is resilient has a permanent set which tends continuously to move it away from the plate 2. By turning down the nut 7, however, the plate 4 may be brought closer to the plate 2 and ultimately into contact with the mica strip 3, which prevents contact between the plates. The nut 7 therefore constitutes a means for adjusting the plate 4 with respect to the plate 2 and thereby makes possible an accurate adjustment of the capacity of the condenser.

It will be noted that each of the plates 2 and 4 is secured to the strip 1 by means of rivets, 9 and 10 respectively, and that each of the plates is also provided with a projecting lug, 11 and 12 respectively, through the medium of which the condenser may be secured in an electric circuit.

This condenser is adapted for adjustment as to capacity following its assembly in the electrical apparatus of which it constitutes a part. Such adjustments in many instances are extremely critical and require great accuracy, and are made through the medium of a wrench 13 of bakelite or similar insulating material having a socket 14 adapted to fit the nut 7, as illustrated in Fig. 4. While condensers of this type are desirable by reason of simplicity of form and relative cheapness of manufacture, they have not proved entirely satisfactory as previously constructed by reason of the difficulty of obtaining accurate and rapid adjustments. This has been due largely to the fact that the wrench coming into contact with the collar 8 tended to cause a temporary displacement of the plate 4 which resulted in an error of adjustment when the wrench was withdrawn. In order to prevent the weight of the wrench 13 from affecting the position of the resilient plate 4, I provide the nut 7 with projections 15, upon which, as shown in Fig. 4, the wrench may bear whereby the weight or pressure of the wrench falls directly upon the screw 5 and the relatively rigid plate 2. The projections 15 are made in the present instance by gouging out tongues from the sides of the nut in a manner that will be readily understood from the drawing.

In order to prevent possible relative movements of the plates 2 and 4 around the rivets 9 and 10, and consequent contact between the plate 4 and the screw 5, I provide the plate 4 with integral punched-out tongues 16 which surround the insulating collar 8. Any misalignment of the plates brings the collar 8 into contact with one or more of the tongues 16, the latter thereby functioning as stops, and preventing sufficient misalignment to bring the screw into engagement with the edge of the opening 6.

The construction described above makes possible rapid and accurate adjustments of capacity, and prevents short circuiting due to accidental displacement of the elements.

There may be modification without departure from the invention. In some instances for example, it may be desirable to have the plate 2 constituted by the base plate of a radio set, in which event the condenser becomes in effect a built-in part of the apparatus.

I claim:

In a condenser, a relatively fixed element, an apertured movable element, a threaded stem projecting from the fixed element through the aperture in the movable element, a nut on the stem constituting a means for adjusting the movable element toward the fixed element, an insulating washer intermediate the nut and the movable member and having a stem-receiving aperture of lesser size than the aperture in the movable element, and means on the movable member cooperative with the washer for preventing transverse relative displacement of the said elements and consequent contact between the movable element and the stem.

CLINTON BROWN HYATT.